United States Patent
Kagohara et al.

(10) Patent No.: US 6,439,451 B1
(45) Date of Patent: Aug. 27, 2002

(54) METHOD OF MAKING ALUMINUM ALLOY PLATE FOR BEARING

(75) Inventors: Yukihiko Kagohara; Masahito Fujita; Koichi Yamamoto; Takayuki Shibayama, all of Aichi (JP)

(73) Assignee: Daido Metal Company Ltd., Nagoya (JP)

( * ) Notice: Subject to any disclaimer, the term of this patent is extended or adjusted under 35 U.S.C. 154(b) by 34 days.

(21) Appl. No.: 09/739,275

(22) Filed: Dec. 19, 2000

(30) Foreign Application Priority Data

Dec. 12, 2000 (GB) .............................. 0030274

(51) Int. Cl.$^7$ ................. B23K 31/02; B21D 33/00; B32B 31/00
(52) U.S. Cl. ..................... 228/235.2; 29/17.3
(58) Field of Search ............. 228/235.2, 235.1, 228/234.1, 158; 29/904, 12.3, 527.7

(56) References Cited

U.S. PATENT DOCUMENTS

| | | | | |
|---|---|---|---|---|
| 2,693,121 A | * | 11/1954 | Dight | 228/235.2 |
| 3,639,974 A | * | 2/1972 | Finnegan | 228/190 |
| 3,769,687 A | * | 11/1973 | Kozak et al. | 156/178 |
| 4,213,558 A | * | 7/1980 | Hirobe et al. | 164/417 |
| 5,042,711 A | * | 8/1991 | Iskenderian et al. | 219/102 |
| 6,189,770 B1 | * | 2/2001 | Lotz | 228/205 |

* cited by examiner

Primary Examiner—M. Alexandra Elve
Assistant Examiner—Kevin McHenry
(74) Attorney, Agent, or Firm—Browdy and Neimark (57) ABSTRACT

A method of making an aluminum alloy plate for bearing which is made by cladding a bonding layer comprising a pure aluminum or an aluminum alloy excluding Sn onto a bearing alloy layer comprising an aluminum alloy containing Sn. The method includes the steps of fitting a concave portion of a first roll in a convex portion of a second roll, the first roll having both axial ends with large diameter portions respectively, the second roll having both axial ends with small diameter portions respectively, and passing superposed plates formed into the bearing alloy layer and the bonding layer respectively through a roll gap defined between the concave and convex portions and closed by the large diameter portions of the first roll so that the plates are rolled down at a reduction ratio not less than 50% while both widthwise ends of each plate is restricted by the large diameter portions of the first roll respectively such that the bonding layer is cladded onto the bearing alloy layer.

6 Claims, 7 Drawing Sheets

Al-Si-Fe INTERMETALLIC COMPOUND CAST STRUCTURE

Prior art product

| No | Al | Sn | Si | Fe | Mn | V | Mo | Cr | Co | Ni | W | Cu | Ti | Zr |
|---|---|---|---|---|---|---|---|---|---|---|---|---|---|---|
| 1 | Bal. | 20 | 2.5 | 0.2 | — | — | — | — | — | — | — | — | — | — |
| 2 | Bal. | 13 | 3 | 0.4 | — | — | — | — | — | — | — | — | — | — |
| 3 | Bal. | 10 | 3 | 0.5 | — | — | — | — | — | — | — | — | — | — |
| 4 | Bal. | 6 | 4 | 0.5 | — | — | — | — | — | — | — | — | — | — |
| 5 | Bal. | 10 | 2.5 | 0.7 | — | — | — | — | — | — | — | — | — | — |
| 6 | Bal. | 10 | 4 | 0.7 | 0.2 | 0.2 | — | 0.2 | — | — | — | — | — | — |
| 7 | Bal. | 4 | 6 | 1 | — | — | — | — | 0.4 | — | — | — | — | — |
| 8 | Bal. | 10 | 3 | 0.3 | — | 0.2 | 0.3 | — | — | — | 0.15 | 1 | — | — |
| 9 | Bal. | 10 | 3 | 0.4 | 0.3 | — | — | — | — | 0.3 | — | 0.8 | 0.15 | — |
| 10 | Bal. | 13 | 3 | 0.6 | 0.3 | — | — | — | 0.3 | — | — | 0.8 | — | — |
| 11 | Bal. | 8 | 2.5 | 0.8 | — | — | — | 0.2 | — | — | — | 1.5 | — | 0.2 |

Chemical composition of bearing alloy layer

| Chemical composition of bonding layer | | | | Reduction ratio(%) | End crack | Bonding strength (Mpa) |
|---|---|---|---|---|---|---|
| Al | Si | Cu | Mn | | | |
| (pure Al) | | | | 42 | Found | 52 |
| (pure Al) | | | | 43 | Found | 57 |
| Bal. | 6 | | | 45 | Found | 65 |
| Bal. | 6 | | | 45 | Found | 68 |
| (pure Al) | | | | 42 | Found | 58 |
| (pure Al) | | | 1 | 40 | Found | 60 |
| (pure Al) | | | 1 | 45 | Found | 55 |
| (pure Al) | | | | 43 | Found | 62 |
| Bal. | | 1 | | 45 | Found | 67 |
| Bal. | 6 | 1 | | 42 | Found | 64 |
| Bal. | | | 1 | 40 | Found | 60 |

| | | | | Chemical composition of bearing alloy layer | | | | | | | | | | |
|---|---|---|---|---|---|---|---|---|---|---|---|---|---|---|
| | No | Al | Sn | Si | Fe | Mn | V | Mo | Cr | Co | Ni | W | Cu | Ti | Zr |
| Invention product | 12 | Bal. | 20 | 2.5 | 0.2 | — | — | — | — | — | — | — | — | — | — |
| | 13 | Bal. | 13 | 3 | 0.4 | — | — | — | — | — | — | — | — | — | — |
| | 14 | Bal. | 13 | 3 | 0.5 | — | — | — | — | — | — | — | — | — | — |
| | 15 | Bal. | 13 | 4 | 0.5 | — | — | — | — | — | — | — | — | — | — |
| | 16 | Bal. | 10 | 2.5 | 0.7 | — | — | — | — | — | — | — | — | — | — |
| | 17 | Bal. | 10 | 4 | 0.7 | 0.2 | 0.2 | — | 0.2 | — | — | — | — | — | — |
| | 18 | Bal. | 4 | 6 | 1 | — | — | — | — | 0.4 | — | — | — | — | — |
| | 19 | Bal. | 10 | 3 | 0.3 | 0.3 | 0.2 | 0.3 | — | — | — | — | — | — | — |
| | 20 | Bal. | 13 | 3 | 0.4 | 0.3 | — | — | — | — | — | 0.15 | 1 | — | — |
| | 21 | Bal. | 13 | 3 | 0.6 | — | — | — | — | — | 0.3 | — | 0.8 | — | — |
| | 22 | Bal. | 10 | 2.5 | 0.8 | 0.3 | — | — | 0.2 | 0.3 | — | — | 1.5 | — | — |
| | 23 | Bal. | 12 | 4 | 0.3 | — | — | — | — | — | — | — | 0.7 | 0.15 | — |
| | 24 | Bal. | 10 | 3 | 0.4 | 0.3 | — | — | 0.3 | — | — | — | 0.7 | — | 0.2 |
| | 25 | Bal. | 8 | 3 | 0.2 | — | 0.2 | — | — | — | — | — | 0.7 | — | — |

| Chemical composition of bonding layer | | | Reduction ratio (%) | End crack | Bonding strength (Mpa) |
|---|---|---|---|---|---|
| Al | Si | Cu | Mn | | | |
| (pure Al) | | | | 55 | Unfound | 79 |
| (pure Al) | | | | 60 | Unfound | 81 |
| Bal. | 6 | | | 58 | Unfound | 99 |
| Bal. | 6 | | | 62 | Unfound | 96 |
| (pure Al) | | | | 57 | Unfound | 85 |
| (pure Al) | | 1 | | 61 | Unfound | 89 |
| (pure Al) | | 1 | | 59 | Unfound | 84 |
| (pure Al) | | | | 60 | Unfound | 90 |
| Bal. | 6 | | | 59 | Unfound | 101 |
| Bal. | 6 | 1 | | 56 | Unfound | 93 |
| Bal. | 6 | | | 60 | Unfound | 94 |
| Bal. | 6 | 1 | 1 | 62 | Unfound | 107 |
| Bal. | 6 | | | 63 | Unfound | 110 |
| Bal. | 6 | | | 63 | Unfound | 115 |

METHOD OF MAKING ALUMINUM ALLOY PLATE FOR BEARING

BACKGROUND OF THE INVENTION

1. Field of the Invention

This invention relates to a method of making an aluminum alloy plate for bearing by cladding a bonding layer comprising a pure aluminum or an aluminum alloy excluding Sn onto a bearing alloy layer comprising an aluminum alloy.

2. Description of the Prior Art

In making a bearing lined with an aluminum alloy (aluminum alloy bearing), a bearing alloy layer comprising an aluminum alloy containing Sn is generally bonded to a back metal with a bonding layer being interposed therebetween, so that a bimetal is made. The bonding layer comprises a pure aluminum or an aluminum alloy. The bimetal is then machined into an aluminum alloy bearing. The bonding layer is bonded to the bearing alloy layer prior to bonding of the bearing alloy layer to the back metal. The bonding layer is cladded onto the bearing alloy layer when bonded thereto. More specifically, a plate formed into the bearing alloy layer and a plate formed into the bonding layer are passed between a pair of flat rolls so that the plates are rolled down at a large reduction ratio such that the bonding layer is cladded onto the bearing alloy layer.

The aluminum alloy bearing is generally used for engines of automobiles or industrial machines since it has excellent fatigue resistance, wear resistance, etc. However, with recent advancement in the performance of engine, the bearing has necessitated a further improvement in the fatigue strength, wear resistance, etc. The bearing aluminum alloy has been changed from a relatively soft Al—Sn system to a hard Al—Sn—Si system or Al—Sn—Si—Mn system in order that the requirement may be met.

However, the bearing aluminum alloy of hard Al—Sn—Si system or Al—Sn—Si—Mn system has a low rolling workability of the aluminum alloy. Accordingly, there is a possibility that crack may occur when the bonding layer is cladded onto the bearing alloy layer. The crack occurs in both widthwise edges of the aluminum alloy plate formed into the bearing layer.

When a bonding layer plate is cladded on a bearing alloy layer plate so that both are bonded together, a higher bonding strength is ensured as the reduction ratio becomes high. Accordingly, the bonding layer plate is cladded on the bearing alloy layer plate at a reduction ratio of 40 to 50% when a relatively soft Al—Sn alloy is used for the bearing alloy layer. The reduction ratio is defined as [(plate thickness prior to rolling—plate thickness after rolling)/plate thickness prior to rolling]×100.

However, the Al—Sn—Si alloy or Al—Sn—Si—Mn alloy, each of which serves as the bearing alloy layer and has a low rolling workability, cannot withstand pressurization or cladding at such a high reduction ratio as mentioned above in order that occurrence of crack may be prevented for increase in the yield. Accordingly, since the bonding layer is cladded onto each layer of these bearing alloys at a low reduction ratio, the bonding strength between the bearing alloy layer and the bonding layer becomes insufficient.

SUMMARY OF THE INVENTION

Therefore, an object of the present invention is to provide a method of making an aluminum alloy plate for bearing in which even when an aluminum alloy having a low rolling workability is used for the bearing alloy layer, the bonding layer can be cladded onto the bearing alloy layer at a high reduction ratio while occurrence of crack is prevented, so that an aluminum alloy plate for bearing having a sufficient bonding strength can be made.

To achieve the object, the present invention provides a method of making an aluminum alloy plate for bearing which is made by cladding a bonding layer comprising a pure aluminum or an aluminum alloy excluding Sn onto a bearing alloy layer comprising an aluminum alloy. The method comprises the steps of fitting a concave portion of a first roll in a convex portion of a second roll, the first roll having both axial ends with large diameter portions respectively, the second roll having both axial ends with small diameter portions respectively, and passing superposed plates formed into the bearing alloy layer and the bonding layer respectively through a roll gap defined between the concave and convex portions and closed by the large diameter portions of the first roll so that the plates are rolled down at a reduction ratio of not less than 50% while both widthwise ends of each plate is restricted by the large diameter portions of the first roll respectively such that the bonding layer is cladded onto the bearing alloy layer.

According to the above-described method, the axial large diameter portions of the first roll closing both ends of the roll space restrict the widthwise ends of each plate, thereby preventing widthwise extension of each plate. Consequently, since occurrence of crack is reduced, both layers can be rolled down at a high reduction ratio of not less than 50% even when the aluminum alloy having a low rolling workability is used for the bearing alloy layer, whereupon the bonding strength between the plates can be increased.

In a first preferred form, a cast plate quenched at 3 to 6° C./sec. by a belt casting machine is used as the plate made into the bearing alloy. The belt casting machine performing casting between a pair of endless belts is known in the art. The known belt casting machine has a casting space defined to be horizontal or slightly inclined between substantially horizontal portions of the belts. The belts are driven to travel while being cooled. A molten metal is supplied into the casting space and cooled by the belts to be solidified into the shape of a plate. The solidified metal is then fed out of the casting space continuously.

The aforesaid belt casting machine of the movable mold type has a higher casting speed and productivity than continuous casting machines of the fixed mold type. Accordingly, even bearing manufacturers employ belt casting machines to cast aluminum alloy plates for a bearing alloy layer. However, the conventional belt casting machines have low cooling rates such that a cast plate is gradually cooled. As a result, since crystals become easy to coarsen or segregate, the rolling workability and bearing characteristic are deteriorated.

In view of the above-described problem, the inventors developed a belt casting machine with a water sprayer. A cast plate fed out of the casting space is quenched at a cooling rate of 3 to 6° C./sec. by water sprayed from the water sprayer so that the crystals are prevented from coarsening. However, since the machine carries out the belt casting method although being provided with the water sprayer, the casting speed becomes high but the cooling rate becomes low. Accordingly, it is difficult to completely prevent the crystals from being coarsened. Thus, the bearing alloy plate made by the belt casting machine with the water sprayer fairly improves a rolling workability but is still difficult to roll. Particularly when the plate contains Si, the cladding using ordinary flat rolls results in occurrence of crack on the widthwise edges of the plate.

The bonding layer can be cladded onto the bearing alloy plate cast by the belt casting machine by the method of the present invention without occurrence of crack, although the plate is fairly difficult to roll. In the casting by the above-described belt casting machine, Sn and Si segregate and an intermetallic compound with aluminum coarsens or segregates when the cooling rate is below 3° C./sec. As a result, the plastic workability such as rolling workability is reduced such that the fatigue resistance and wear resistance both as the bearing characteristics become unstable. When the cooling rate exceeds 6° C./sec., quenching results in segregation on the surface of the plate, whereupon milling the surface of the plate becomes difficult.

In the present invention, the following two novel aluminum alloys are particularly suitable as the bearing alloy layer on which the bonding layer is cladded. One is a novel aluminum alloy comprising, by mass, 3 to 40% Sn, 0.5 to 7% Si, 0.05 to 2% Fe, and balance of Al and unavoidable impurities and a ternary-element intermetallic compound of Al—Si—Fe is crystallized. The other is a novel aluminum compound comprising, by mass, 3 to 40% Sn, 0.5 to 7% Si, 0.05 to 2% Fe, at least one or more of Mn, V, Mo, Cr, Co, Ni and W in an amount or a total amount of 0.01 to 3%, and balance of Al and unavoidable impurities and a multi-element intermetallic compound of Al—Si—Fe containing said at least one or more of Mn, V, Mo, Cr, Co, Ni and W, is crystallized.

The technical background of the development of the aforesaid novel aluminum alloys will now be described. With recent development of high performance engines, engine bearings necessitate further improvement in the fatigue strength and wear resistance. Regarding the fatigue strength, elements such as Cu, Mn and V are added to the aluminum alloy to strengthen the latter. For the purpose of improvement in the wear resistance, JP-A-58-64332 discloses that Si is added to the aluminum alloy and the size and distribution of Si particles crystallized in the aluminum alloy are controlled. Further, JP-A-58-67841 discloses that Mn, Fe, Mo, Ni, etc. are added to the aluminum alloy so that an intermetallic compound between Mn etc. and Al is crystallized in the aluminum alloy. These two cases propose an improvement in the conformability and anti-seizure property of the aluminum alloy, thereby improving the wear resistance.

The above-noted JP-A-58-64332 and JP-A-58-67841 disclose that a desired effect can be achieved when the sizes of Si particles and the intermetallic compound range between 5 μm and 40 μm, respectively. Generally, hard particles contained in Al are uniformly distributed to be used for strengthening the aluminum alloy, and the effect is larger as the size of particles becomes small. In the aforesaid two cases, however, when the size of Si and the intermetallic compound are controlled so as to range between 5 μm and 40 μm, the strength of the Al matrix and accordingly the fatigue strength of the Al alloy are reduced as the size of Si and the intermetallic compound is relatively large. Thus, the anti-seizure property cannot be improved when crystallized particles are rendered small for improvement in the fatigue strength. On the other hand, the fatigue strength cannot be improved when the crystallized particles are rendered large for improvement in the anti-seizure property and accordingly in the wear resistance.

The inventors developed an Al alloy by crystallizing a ternary intermetallic compound of Al—Si—Fe or a multi-element intermetallic compound containing Al—Si—Fe as the base. The Al alloy can improve the anti-seizure property and wear resistance without reduction in the fatigue strength. The ternary intermetallic compound of Al—Si—Fe and the multi-element intermetallic compound containing Al—Si—Fe as the base are exceedingly stable, and its basic shape is not changed even by the heat treatment after cladding with a back metal. More specifically, Si crystallizes as a eutectic in the form like a three-dimensionally connected coral. The crystallized Si is crushed to pieces by rolling after casting or rolling in the cladding with the back metal. Further, Si also changes its form by a subsequent heat treatment. This is a characteristic of Si and particularly in the heat treatment in which the temperature exceeds 300° C., Si changes into a relatively rounded so that a surface tension thereof is reduced. This tendency is enhanced in a material containing a large amount of Sn, for example, an Al—Sn bearing alloy.

Figure 4:
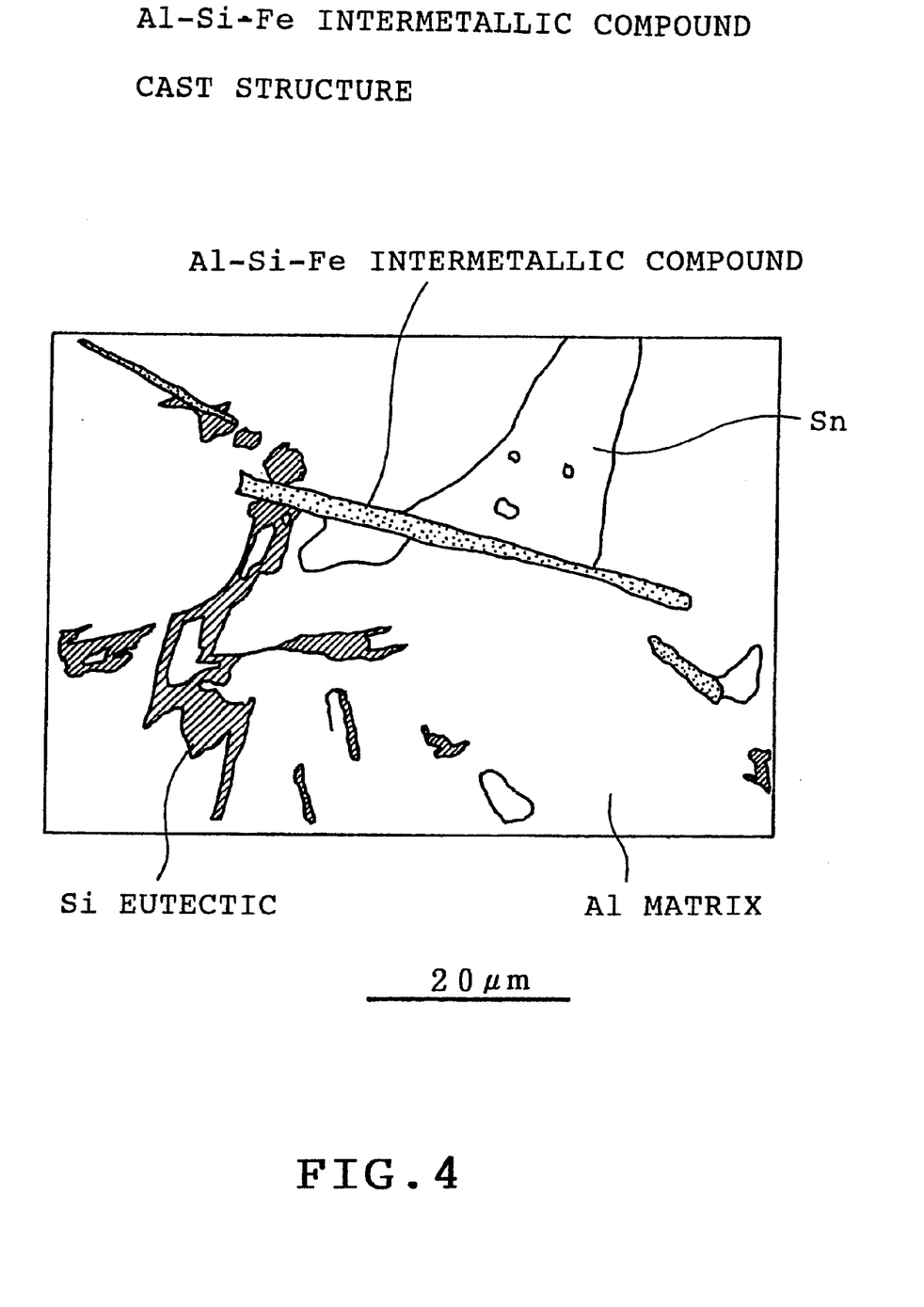
FIG. 4 is a schematic illustration of a microstructure of a cast plate in which an Al—Si—Fe ternary intermetallic compound is crystallized.
Figure 5:
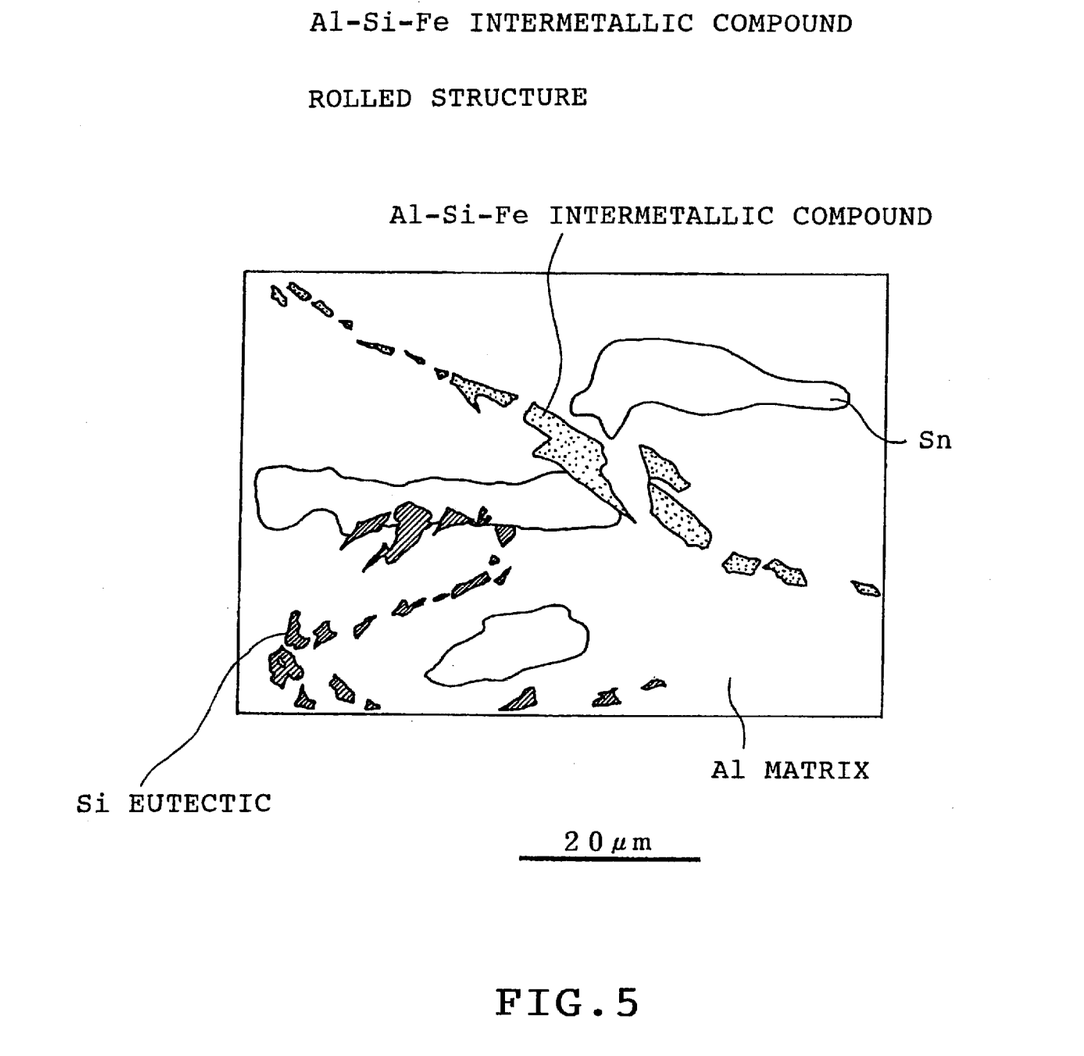
FIG. 5 is a schematic illustration of a microstructure similar to FIG. 4, showing the state of the cast plate after rolling.

However, the aforesaid ternary intermetallic compound or multi-element intermetallic compound does not change its crystallized form (an example is shown in FIG. 4) and does not change its form at a temperature for a usual heat treatment. Further, the ternary or multi-element intermetallic compound is crushed in the rolling step with plastic deformation or the cladding step during manufacture of the bearing. However, as the result of crush, the intermetallic compound takes a form with a sharp edge such as a broken piece of an edged tool. FIG. 5 shows an example of such a form. Although Si particles are rounded and broken into pieces through the steps of rolling and heat treatment, the aforesaid ternary or multi-element intermetallic compound retains an aggressive form with a sharp edge.

The ternary or multi-element intermetallic compound has a lapping effect on an associated shaft even when its amount is small. Particularly, the ternary or multi-element intermetallic compound stabilizes the relationship between the shaft in an unstable initial operation and the bearing. Thus, the ternary or multi-element intermetallic compound is effective in improving the conformability. More concretely, the ternary or multi-element intermetallic compound scrapes off protrusions on the surface of the shaft and an edge such as burrs around nodular graphite on the surface of the shaft. The ternary or multi-element intermetallic compound further prevents the Al alloy from wear due to adhesion to the shaft, which is a disadvantage of the Al alloy. Additionally, the ternary or multi-element intermetallic compound further scrapes away an adherent matter to thereby prevent seizure due to the adherent matter. Moreover, the ternary or multi-element intermetallic compound is relatively large even after the rolling step. Minutely pulverized Si particles are distributed in the Al matrix, thereby improving the strength of the Al matrix. Consequently, both improvement in the wear resistance and anti-seizure property and improvement in the fatigue strength can be achieved.

The reasons for the amount limitation of each novel Al alloy will be described below.

(1) Sn (3 to 40 mass %)

Sn improves surface properties such as anti-seizure property, conformability and embeddability as a bearing. When the Sn content is less than 3%, the above-mentioned effects are small. When it exceeds 40%, mechanical properties of the bearing alloy are deteriorated with the result of reduction in the bearing performance. A preferable Sn content ranges between 6 and 20%.

(2) Si (0.5 to 7 mass %)

Si dissolves in the aluminum matrix and partially crystallizes as a single substance of silicon particle to disperse finely, so as to enhance the fatigue strength of the material and serve to improve the anti-seizure property and wear resistance. On the other hand, Si is an essential element in order to form the Al—Si—Fe intermetallic compound and improves the lapping effect, anti-seizure property, and wear resistance. When the Si content is less than 0.5%, Si dissolves into the Al matrix such that the above effects are small. When it exceeds 7%, its crystal is coarsened, so as to reduce the fatigue strength of the bearing alloy. A preferable Si content ranges between 2 and 6%.

(3) Fe (0.05 to 2 mass %)

Fe crystallizes mainly as the Al—Si—Fe intermetallic compound, so as to produce the above-described effects. The intermetallic compound containing Fe prevents seizure with a shaft and improves the wear resistance. The characteristic is effective when the Fe content ranges between 0.05 and 2%. When the Fe content is less than 0.05%, the above-mentioned effects are small. When the Fe content exceeds 2%, the compound is coarsened and the bearing alloy becomes brittle, whereupon the rolling work causes trouble. A preferable Fe content ranges between 0.07 and 1%.

(4) Mn, V, Mo, Cr, Co, Ni, and W (at least one or more in an amount or a total amount of 0.01 to 3 mass %)

These are optional elements which constitute the multi-element intermetallic compound in the present invention. More specifically, when a selected element a is added to Al—Si—Fe, a multi-element intermetallic compound of Al—Si—Fe-$\alpha$ is produced. The selected element dissolves in the aluminum matrix as a single substance to thereby strengthen the matrix. Effects of the multi-element intermetallic compound cannot be expected when the content of each element is less than 0.01%. When the content of each element exceeds 3%, the multi-element intermetallic compound is excessively coarsened such that the physical properties of the bearing alloy are degraded and plastic workability of the bearing alloy such as rolling is degraded. A preferable content ranges between 0.2 and 2%.

BRIEF DESCRIPTION OF THE DRAWINGS

Other objects, features and advantages of the present invention will become clear upon reviewing of the following description of the preferred embodiment, made with reference to the accompanying drawings, in which.

DETAILED DESCRIPTION OF THE PREFRRED EMBODIMENTS

One embodiment of the present invention will be described with reference to the accompanying drawings.

Figure 3:
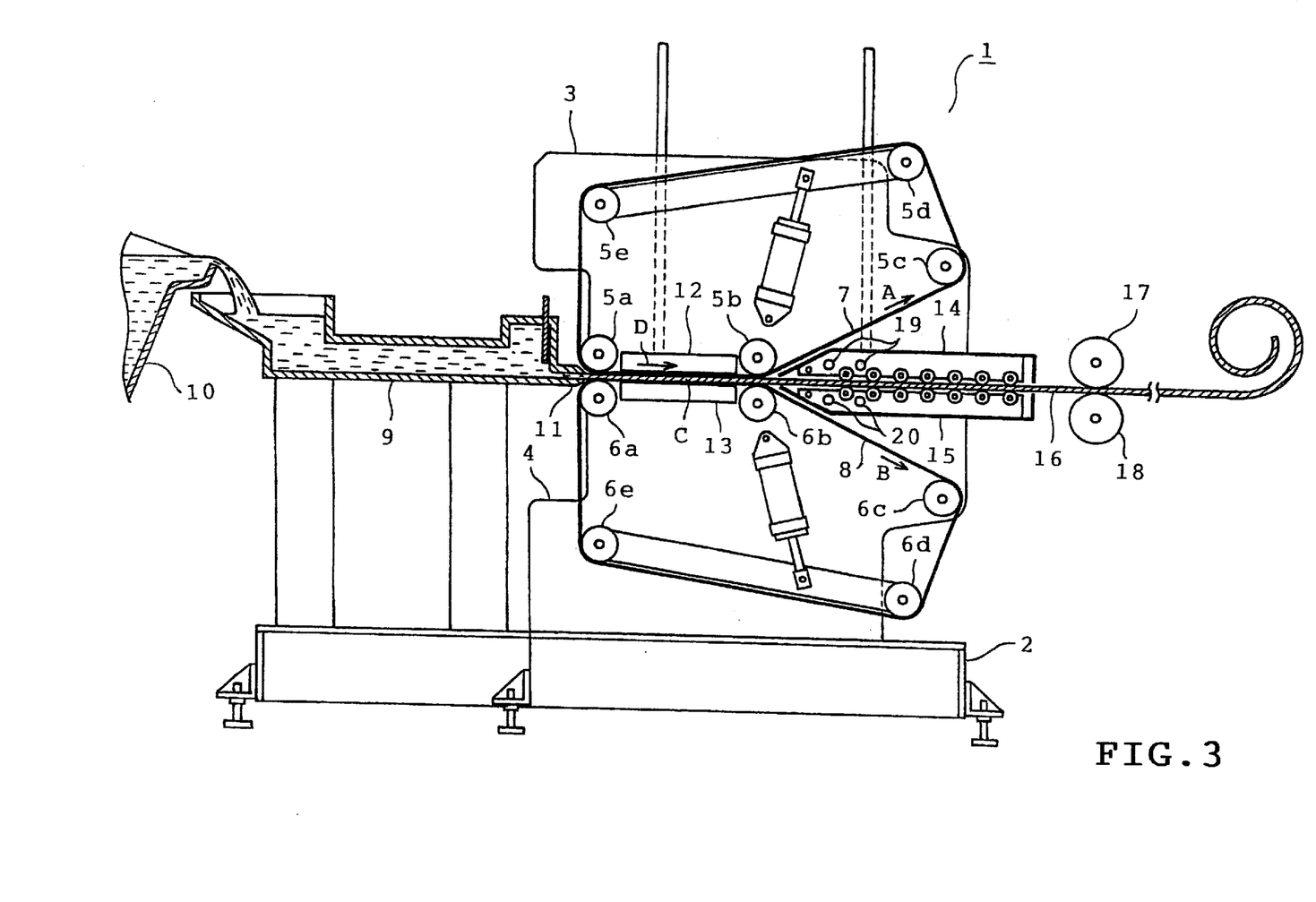
FIG. 3 is a longitudinal side section of a belt casting machine.

Referring first to FIG. 3, a belt casting machine 1 is shown which casts an aluminum bearing alloy into the shape of a plate. The belt casting machine 1 comprises a base 2 and a pair of upper and lower machine frames 3 and 4. A plurality of rollers 5a to 5e and 6a to 6e are mounted on the frames 3 and 4 respectively. A pair of endless belts 7 and 8 are passed through the rollers 5a–5e and 6a–6e respectively. Each endless belt is made of a steel plate or heat-resistant fiber.

The rollers 5a–5e and 6a–6e are coupled to respective electric motors (not shown). Upon drive of the motors, the belts 7 and 8 are driven so as to travel in the directions of arrows A and B respectively. A part of the upper endless belt 7 between the rollers 5a and 5b is substantially parallel to a part of the lower endless belt 8 between the rollers 6a and 6b. A space where the belts 7 and 8 are parallel to each other serves as a casting space C. Right-hand and left-hand sides of the casting space C are closed by sealing members (not shown) respectively. A molten metal reservoir 9 serving as molten metal supplying means is provided on the left-hand side of the base 2 so as to be located at one end side of the casting space C. A molten metal for an aluminum alloy is supplied from a molten metal crucible 10 into the molten metal reservoir 9. The molten metal reservoir 9 includes a nozzle 11 through which the molten metal is supplied into the casting space C.

The belt casting machine 1 includes water-cooling jackets 12 and 13 for cooling the endless belts 7 and 8 respectively. The water-cooling jackets 12 and 13 are mounted on the machine frames 3 and 4 so as to come into contact with parallel portions of the endless belts 7 and 8 at opposite sides respectively. The water-cooling jackets 12 and 13 cool via the endless belts 7 and 8 the molten metal of the aluminum alloy supplied into the casting space C.

Two vertically opposed roller conveyors 14 and 15 are provided on the upper and lower machine frames 3 and 4 so as to be located at the other end side of the casting space C. An aluminum alloy cast into the shape of a plate in the casting space C (cast plate 16) is fed out to a section between the roller conveyors 14 and 15. The cast plate 16 fed out by the roller conveyors 14 and 15 is subsequently held between pinch rollers 17 and 18 to be finally wound into the shape of a coil by a winding machine (not shown).

Two water-spraying pipes 19 and 20 are provided on portions of the roller conveyors 14 and 15 at the casting space C side respectively. The water-spraying pipes 19 and 20 serve as water spraying means for spraying water onto portions of both sides of the cast plate 16 immediately after the cast plate has been fed out of the casting space C. The pipes 19 and 20 are arranged in the direction of arrow D in which the cast plate 16 is fed. Although a thickness of the cast plate 16 is set at 15 mm in the embodiment, the thickness is variable by adjusting the vertical position of the upper machine frame 3 (which is provided to move vertically) so that a height of the casting space C is adjusted.

The operation of the belt casting machine 1 will now be described. When a molten metal for the aluminum alloy is supplied from the molten metal crucible 10 into the molten metal reservoir 9, the molten metal is fed from a nozzle 11 of the reservoir 9 into the casting space C. The molten metal fed into the casting space C is cooled via the endless belts 7 and 8 by the water-cooling jackets 12 and 13. The molten metal gradually solidifies as the result of cooling and is fed in the direction of arrow D by the endless belts 7 and 8 travelling in the directions of arrows A and B respectively while being formed into the shape of a plate. The water-spraying pipes 19 and 20 spray water onto portions of both sides of the cast plate 16 immediately after these portions have been fed out of the casting space C. The cast plate 16 is thus cooled by the sprayed water immediately when fed out of the casting space C. The cast plate 16 is cooled by the water-cooling jackets 12 and 13 and continuously cooled by the water sprayed by the water spraying pipes 19 and 20. The cast plate 16 is rapidly cooled by the sprayed water and the solidification is then completed.

An aluminum alloy employed in the embodiment comprises, by mass, 3 to 40% Sn, 0.5 to 7% Si and 0.05 to 2% Fe, or 3 to 40% Sn, 0.5 to 7% Si, 0.05 to 2% Fe and at least one or more of Mn, V, Mo, Cr, Co, Ni and W in an amount or a total amount of 0.01 to 3%. The aluminum alloy may further comprise, by mass, at least one or more of B, Ti and Zr in an amount or a total amount of 0.01 to 2% or at least one or more of Cu, Mg and Zn in an amount or a total amount of 0.1 to 5%. The optional elements, B, Ti and Zr, do not contribute to formation of the Al—Si—Fe intermetallic compound, dissolving in the aluminum matrix, so as to improve the fatigue strength of the bearing alloy. The aforesaid effect is small when the content is less than 0.01%. When the content exceeds 2%, the bearing alloy becomes brittle. A preferable content ranges between 0.02 and 0.5%. The optional elements, Cu, Mg and Zn, are additional elements which improve the strength of the aluminum matrix. A solid solution treatment forces these elements to dissolve in the aluminum matrix. When these elements are quenched and aged, fine compounds can be precipitated. The effects cannot be expected when the additive amount is less than 0.1%. When the additive amount exceeds 5%, the compound becomes coarse. A preferable additive amount ranges between 0.5% and 4%.

The molten metal supplied into the casting space C is at about 800° C. Solidification is regarded to be completed when the cast plate 16 is cooled until a portion of the cast plate excluding Sn is cooled to about 500° C. An amount of water supplied into each water-cooling jacket 12 and 13 and an amount of water sprayed by each water-spraying pipe 19 and 20 are set so that the temperature of the cast plate 16 is reduced from 800° C. as the casting starting temperature to 500° C. at a cooling rate of 3 to 6° C./sec. by the water-cooling jackets 12 and 13 and the water-spraying pipes 19 and 20 until the solidification is completed. As the result of the above-described rapid cooling at such a cooling rate, the crystallized intermetallic compound in the cast plate 16 is prevented from being coarsened and segregated. Accordingly, the cooling rate is defined as the cooling rate ΔT=(casting starting temperature T−500)/(cooling time period elapsing from the start of casting to the time the temperature of cast plate is decreased to 500° C.).

The ternary intermetallic compound of Al—Si—Fe or the multi-element intermetallic compound of Al—Si—Fe—Mn etc. is crystallized and the Si particles are crystallized in the continuously cast plate 16 as shown in FIG. 4. Further, the cooling rate of the cast plate 16 is controlled so as to range between 3 and 6° C./sec. in the casting step, whereby the size of the crystallized intermetallic compound can be controlled so as to range between 30 and 70 μm and the size of the Si eutectic structure can be controlled so as to be at or below 40 μm.

Thereafter, the continuously cast plate 16 is continuously cold-rolled so that the thickness thereof is reduced from 15 mm to 6 mm. A thin plate 21 for forming a bonding layer is then cladded on the cast plate 16. The plate 21 comprises a pure aluminum or an aluminum alloy excluding Sn. When an aluminum alloy is used for the bonding layer plate 21, it preferably contains 0.1 to 10 mass % one or more of Cu, Si, Mn and Fe for improving the strength of the aluminum matrix. These elements are strengthening ones, and are dissolved in the aluminum matrix, crystallized finely or precipitated, thereby preventing formation of a coarse compound. The above-noted effect cannot be achieved when the content of at least one or more of the elements is less than 0.1 mass % in an amount or a total amount. When the content of at least one or more of the elements exceeds 10 mass %, the plate 21 is excessively hardened such that the plastic workability is reduced.

Figure 1:
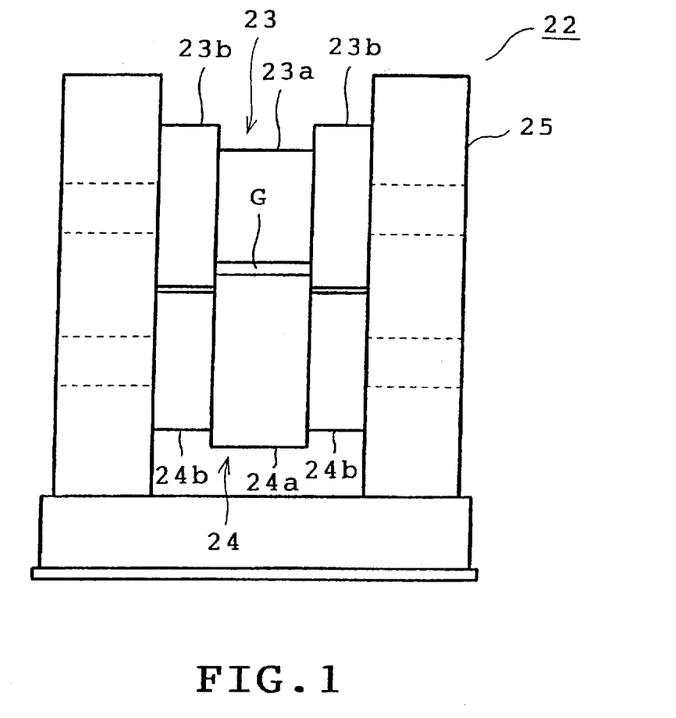
FIG. 1 is a longitudinal section of a rolling machine of one embodiment in accordance with the present invention.
Figure 2:
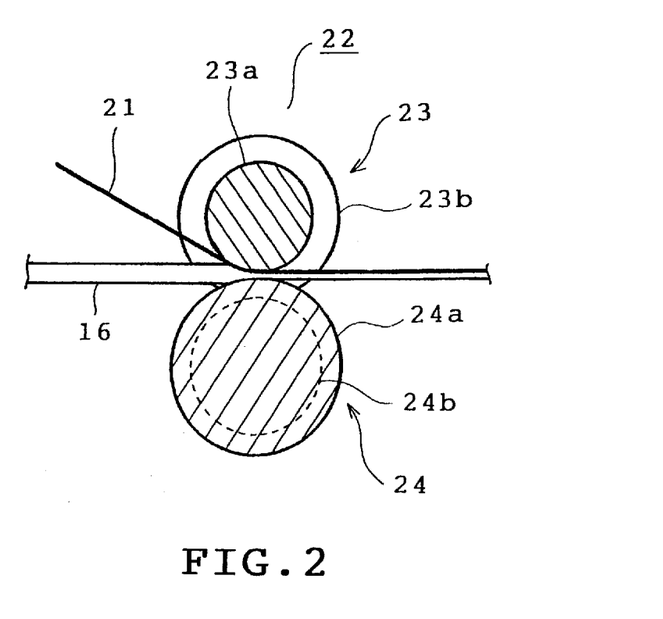
FIG. 2 is a longitudinal side section of the rolling machine.

The cladding of the bonding layer plate 21 on the cast plate 16 is carried out using a pair of rolls 23 and 24 of the rolling machine 22. Both plates 16 and 21 have approximately the same width. The rolls 23 and 24 are rotatably mounted on the frame 25 of the rolling machine 22 so that the roll 23 is located over the roll 24. The upper roll 23 includes a barrel 23a and two large diameter portions 23b formed on both axial ends of the barrel 23a respectively, so that the upper roll 23 has a concave middle portion. The lower roll 24 includes a barrel 24a and two small diameter portions 24b formed on both axial ends of the barrel 24a, so that the lower roll 24 has a convex middle portion. The barrels 23a and 24a have axial dimensions set so as to be substantially equal to the width of each of the cast plate 16 and the bonding layer plate 21. The convex middle portion of the lower roll 24 (the barrel 24a) is fitted in the concave middle portion of the upper roll 23 (the barrel 23a) and between the large diameter portions 23b. Consequently, a roll gap G is defined by a clearance between the barrels 23a and 24a. Both ends of the roll gap G are closed by the respective large diameter portions 23b. A vertical dimension of the roll gap G is set so that the cast plate 16 and bonding layer plate 21 are rolled down at a reduction ratio of not less than 50%.

The plates 16 and 21 superposed one upon the other are passed through the roll gap G between the paired rolls 23 and 24 and rolled at a large reduction ratio of not less than 50%. In this case, both plates 16 and 21 tend to extend widthwise as the result of rolling. However, the widthwise ends of the plates 16 and 21 are in abutment with the respective large diameter portions 23b, whereby the widthwise extension of the plates 16 and 21 is prevented. Consequently, occurrence of crack is prevented in the widthwise ends of both plates and particularly of the cast plate 16 having a low rolling workability.

After the bonding plate 21 is cladded on the cast plate 16, the cast plate 16 is cladded onto a back metal with-the bonding plate 21 being interposed therebetween, resulting in a cast plate bonded to a back metal for an aluminum alloy bearing. Annealing is then carried out in order that a bonding strength may be increased between the cast plate 16 and the back metal. Thereafter, a solid solution treatment is carried out in order that the aluminum alloy may be strengthened. In the solid solution treatment, the bimetal is left in the atmosphere at 470° C. for 20 minutes. After water quenching, an aging treatment is carried out. The bimetal is left in the atmosphere at 170° C. for 15 hours in the aging treatment.

The intermetallic compound is crushed as the result of execution of the aforesaid rolling, cladding, etc. such that its size is reduced from the initial one ranging between 40 and 55 μm to a range of 1 to 20 μm. As a result, the intermetallic compound is formed into an angular shape with sharp edges as shown in FIG. 5. Further, 6 to 200 hard particles consisting of the intermetallic compound are distributed per square millimeter. The size and distribution of the hard particles remain almost unchanged even after a subsequent heat treatment. On the other hand, the Si particles are also crushed by the rolling, cladding, etc. After the aging treatment, the Si particle finally has a rounded shape with its maximum diameter being less than 5 μm. 200 or more Si particles are distributed per square millimeter. Subsequently, the bimetal is machined into a semi-cylindrical bearing.

According to the foregoing embodiment, the plates 16 and 21 are rolled down while axial extension of the axial ends of the plates are restricted by the large diameter portions 23b of the upper roll 23, whereby the plate 16 is cladded on the plate 21. Consequently, occurrence of crack can be prevented in the axial ends of both plates 16 and 21 when the plate 16 is cladded on the plate 21. Accordingly, even when the reduction ratio is set to be not less than 50%, the plate 16 can be cladded on the plate 21 without occurrence of crack, whereupon the bonding strength can be improved.

The bearing alloy layer plate 16 is made of an aluminum alloy of Al—Sn—Si, Al—Sn—Si—Mn or an aluminum alloy crystallizing a ternary intermetallic compound of Al—Si—Fe or a multi-element intermetallic compound comprising Al—Si—Fe as a base. Each of these aluminum alloys has a low ductility. However, the plate 16 can be cladded on the plate 21 without occurrence of crack by the employment of the rolling machine 22 in accordance with the present invention.

Figure 7A:
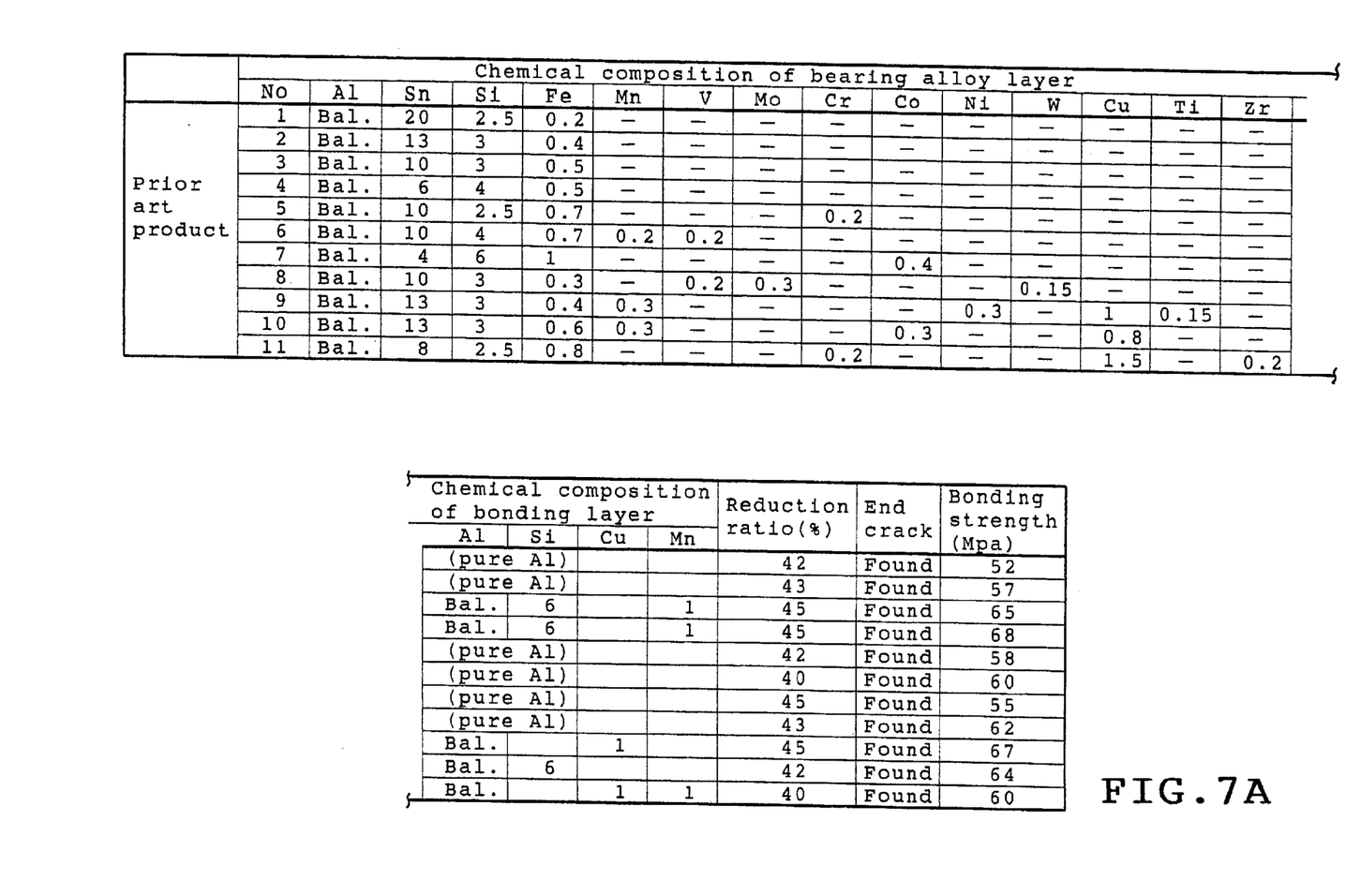
FIGS. 7A and 7B show the results of an investigation of crack and a test of bonding strength when the bonding layer is cladded onto the bearing alloy layer by the prior art manner and the method of the present invention.
Figure 7B:
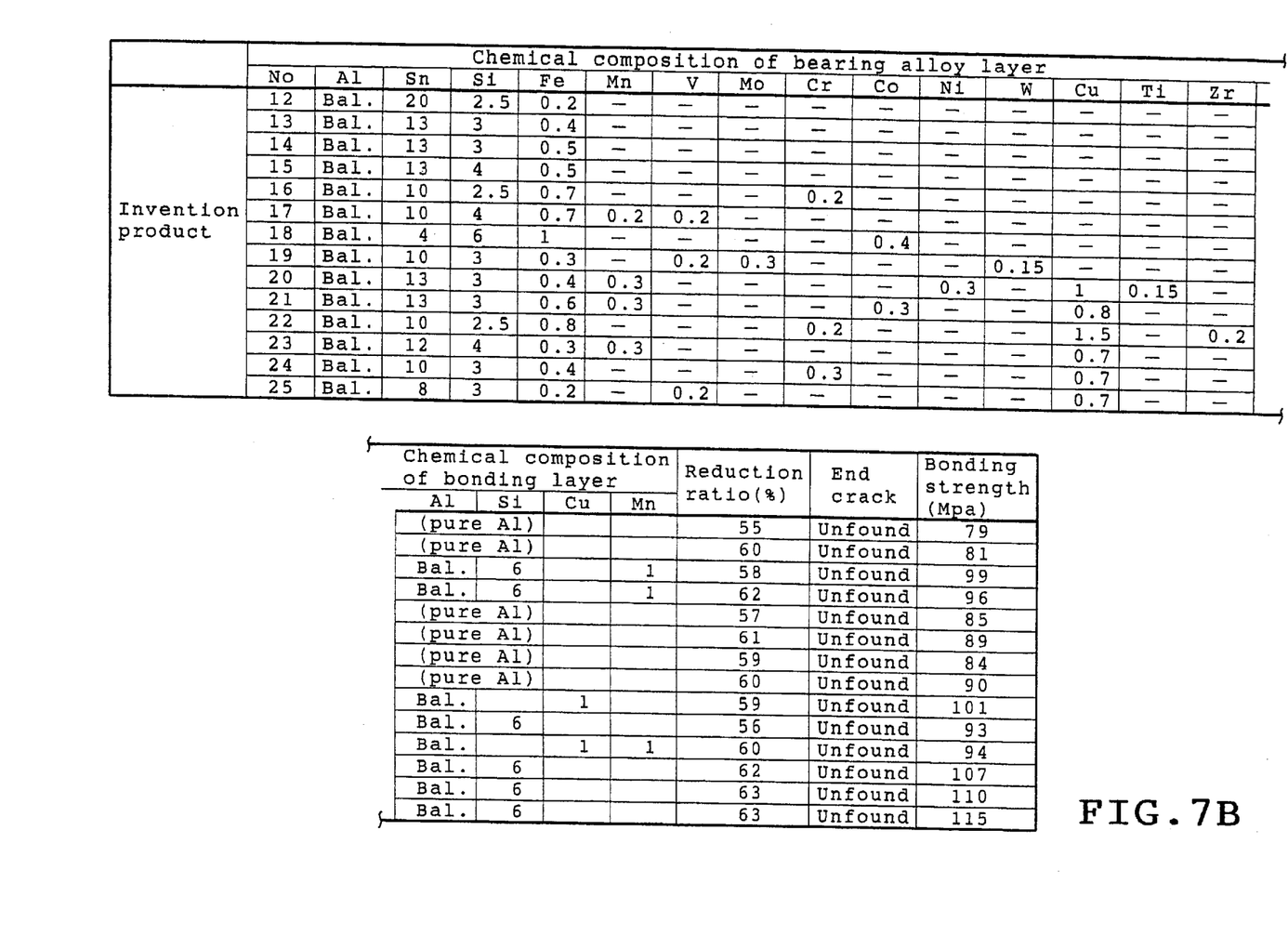

FIGS. 7A and 7B show the results of an investigation of crack and a test of bonding strength regarding prior art products made by cladding using the rolling machine with flat rolls and invention products made by cladding using the rolling machine 22 respectively. Invention product Nos. 23 to 25 were manufactured by the belt casting machine 1 carrying out the method of the present invention.

Figures 6A, 6B:
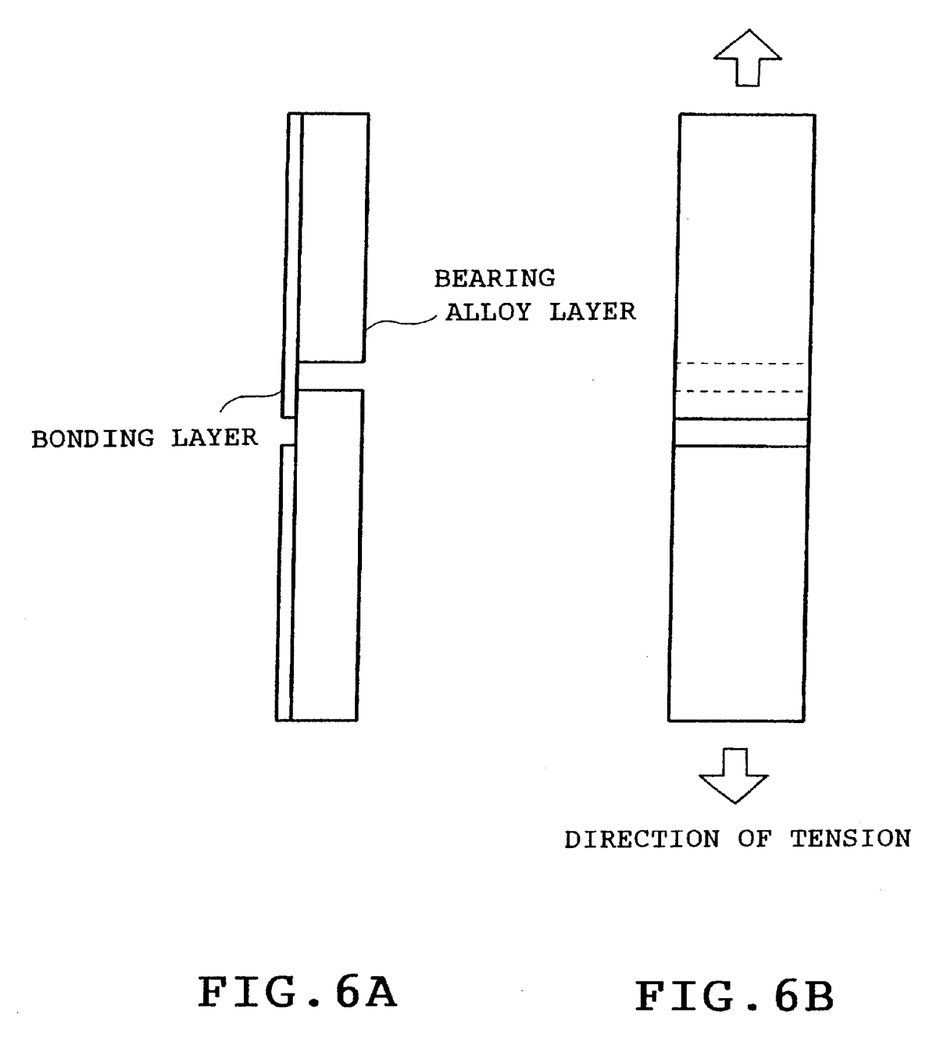
FIGS. 6A and 6B are views of a test piece for measurement of bonding strength.

As obvious from FIGS. 7A and 7B, cracks occur in the prior art products even when the reduction ratio is not more than 45%. On the other hand, no crack occurs in the invention products even when the reduction ratio is not less than 60%. Thus, it can be understood that the method of the present invention prevents occurrence of crack with high effectiveness. Further, since the reduction ratio is not less than 50% in the present invention, an excellent bonding property can be achieved between the bearing alloy layer and the bonding layer. Thus, each invention product has a higher bonding strength than each prior art product. The bonding strength was measured by a test piece and a test method as shown in FIGS. 6A and 6B and is shown as a maximum tensile load.

Any plate other than that cast by the belt casting machine 1 may be used for the bearing alloy layer. Further, the bearing alloy layer may be an aluminum alloy including Sn.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:
1. A method of making an aluminum alloy plate for bearing which is made by cladding a bonding layer comprising a pure aluminum or an aluminum alloy excluding Sn onto a bearing alloy layer comprising an aluminum alloy containing Sn, the method comprising the steps of:
fitting a concave portion of a first roll in a convex portion of a second roll, the first roll having both axial ends with large diameter portions respectively, the second roll having both axial ends with small diameter portions respectively; and
passing superposed plates formed into the bearing alloy layer and the bonding layer respectively through a roll gap defined between the concave and convex portions and closed by the large diameter portions of the first roll so that the plates are pressurized at a reduction ratio of not less than 50% while both widthwise ends of each plate is restricted by the large diameter portions of the first roll respectively such that the bonding layer is cladded onto the bearing alloy layer.

2. A method according to claim 1, wherein the plate formed into the bearing alloy layer is cast by a belt casting machine comprising a pair of travelling endless belts defining a casting space between substantially parallel opposed portions thereof and a water sprayer spraying water onto a cast plate fed out of the casting space to cool the plate so that a cooling rate ΔT ranges between 3 and 6° C./sec. where ΔT=(T−500)/t, T is a temperature when the casting of the aluminum alloy starts, t is a time in sec. between start of casting and the cooling time when the temperature of the aluminum bearing alloy decreases to 500° C.

3. A method according to claim 1, wherein the bearing alloy layer comprises, by mass, 3 to 40% Sn, 0.5 to 7% Si, 0.05 to 2% Fe, and balance of Al and unavoidable impurities and a ternary-element intermetallic compound of Al—Si—Fe is crystallized.

4. A method according to claim 2, wherein the bearing alloy layer comprises, by mass, 3 to 40% Sn, 0.5 to 7% Si, 0.05 to 2% Fe, and balance of Al and unavoidable impurities and a ternary-element intermetallic compound of Al—Si—Fe is crystallized.

5. A method according to claim 1, wherein the bearing alloy layer comprises, by mass, 3 to 40% Sn, 0.5 to 7% Si, 0.05 to 2% Fe, at least one or more of Mn, V, Mo, Cr, Co, Ni and W in an amount or a total amount of 0.01 to 3%, and balance of Al and unavoidable impurities and a multi-element intermetallic compound of Al—Si—Fe containing said at least one or more of Mn, V, Mo, Cr, Co, Ni and W, is crystallized.

6. A method according to claim 2, wherein the bearing alloy layer comprises, by mass, 3 to 40% Sn, 0.5 to 7% Si, 0.05 to 2% Fe, at least one or more of Mn, V, Mo, Cr, Co, Ni and W in an amount or a total amount of 0.01 to 3%, and balance of Al and unavoidable impurities and a multi-element intermetallic compound of Al—Si—Fe containing said at least one or more of Mn, V, Mo, Cr, Co, Ni and W, is crystallized.

* * * * *